United States Patent [19]
Kolhouse

[11] Patent Number: 5,336,047
[45] Date of Patent: Aug. 9, 1994

[54] SELF-SEALING WATER PUMP SEAL

[75] Inventor: J. Steven Kolhouse, Columbus, Ind.

[73] Assignee: Cummins Engine Company, Inc., Columbus, Ind.

[21] Appl. No.: 141,478

[22] Filed: Oct. 21, 1993

Related U.S. Application Data

[63] Continuation of Ser. No. 917,775, Jul. 21, 1992, abandoned.

[51] Int. Cl.$^5$ .................................................. F16J 15/32
[52] U.S. Cl. ................................ 415/168; 277/38; 277/58; 277/65; 277/85; 415/230
[58] Field of Search ................ 277/74, 65, 24, 38, 277/58, 59, 85, 92, 95, 152, 153, 172; 415/168.2, 229, 230

[56] References Cited

U.S. PATENT DOCUMENTS

| | | | |
|---|---|---|---|
| 2,907,594 | 10/1959 | Macks | 277/74 |
| 3,022,081 | 2/1962 | Kosatka | 277/39 |
| 3,179,424 | 4/1965 | Carson et al. | 277/37 |
| 3,275,333 | 9/1966 | Scott et al. | 277/39 |
| 3,682,488 | 8/1972 | Matsushima | 277/37 |
| 3,895,811 | 7/1975 | Richard, Jr. et al. | 277/65 |
| 3,917,287 | 11/1975 | Metcalfe | 277/37 |
| 4,277,072 | 7/1981 | Forch | 277/85 |
| 4,348,031 | 9/1982 | Johnston | 277/177 |
| 4,380,416 | 4/1983 | Menager | 415/168.2 |
| 4,402,515 | 9/1983 | Malott | 277/24 |
| 4,421,324 | 12/1983 | Yamamoto et al. | 277/24 |
| 4,426,089 | 1/1984 | Takenaka et al. | 277/65 |
| 4,428,586 | 1/1984 | Romero | 277/25 |
| 4,465,285 | 8/1984 | Toyoda et al. | 277/152 |
| 4,721,312 | 1/1988 | Hornberger | 277/37 |
| 4,958,942 | 9/1990 | Shimizu | 384/486 |
| 4,981,303 | 1/1991 | Matsushima et al. | 277/37 |
| 5,154,576 | 10/1992 | Dorski et al. | 415/168.2 |
| 5,226,786 | 7/1993 | Dorski et al. | 415/168.2 |

FOREIGN PATENT DOCUMENTS

| | | | |
|---|---|---|---|
| 0046251 | 4/1977 | Japan | 277/65 |
| 2054067 | 2/1981 | United Kingdom | 277/65 |

Primary Examiner—William A. Cuchlinski, Jr.
Assistant Examiner—Daniel G. DePumpo
Attorney, Agent, or Firm—Woodard, Emhardt, Naughton, Moriarty & McNett

[57] ABSTRACT

A self-sealing water pump seal for a water pump having a rotating shaft that rotates with respect to a fixed housing comprises a conventional primary face seal and a barrier situated between the primary seal and the weep hole in the fixed housing of the water pump. The barrier causes solids dissolved in and/or carried by the vehicle coolant that escape past the primary seal to be deposited in the conduit leading to the weep hole such that a portion of the conduit becomes clogged over time with the solids thereby creating a secondary seal to the primary face seal.

12 Claims, 5 Drawing Sheets

SELF-SEALING WATER PUMP SEAL

This application is a continuation of application Ser. No. 07/917,775 filed Jul. 21, 1992, now abandoned.

BACKGROUND OF THE INVENTION

This invention relates generally to seals for water pumps, and in particular, the present invention relates to a water pump seal which has the ability to reseal itself in the event of coolant seepage and/or leakage past the primary face seal.

Conventional water pump seals normally include a pair of donut-shaped face seals which are mounted between the rotating shaft and the fixed housing of the water pump. The face seals are normally contained within a casing which includes a spring for resiliently urging the face seals into an abutting and sealing relation to one another. The face seals are normally formed from an extremely hard material, such as ceramic. Any vehicle coolant that escapes through the primary face seal is channeled through an annular conduit located between the rotating shaft and the fixed housing toward a weep hole in the water pump housing. The weep hole channels the escaped coolant toward the ground so that it does not otherwise interfere with the engine.

Even when tile primary face seal is operating properly, small amounts of vehicle coolant seep past the face seal, through the annular conduit and out the weep hole. Oftentimes, this coolant seepage will leave a stain adjacent the weep hole as the coolant evaporates upon being exposed to the atmosphere. These stains are sometimes misinterpreted as a coolant leak which often results in the water pump seal being replaced even though the original water pump seal was working properly.

A much more serious problem develops when the water pump seal is actually defective thus resulting in coolant leakage past the face seal, through the conduit and out the weep hole. Loss of coolant through the face seal is generally much more severe in the case of leakage rather than normal seepage past a properly functioning water pump seal. Defective or otherwise leaky water pump seals must usually be replaced in order to prevent potentially catastrophic damage to the vehicle's engine.

What is needed is a water pump seal which impedes normal coolant seepage from reaching the weep hole and being misinterpreted as a coolant leak, and a water pump seal which seals itself in the event that the face seal becomes defective causing coolant leakage.

SUMMARY OF THE INVENTION

A self-sealing water pump seal for a water pump having a rotating shaft that rotates with respect to a fixed housing. The seal comprises a primary seal mounted between the rotating shaft and tile fixed housing. The primary seal comprises first and second face seal components that are resiliently urged into an abutting and sealing relation to one another. The first face seal component is attached to and rotates with the rotating shaft while the second face seal component is attached to and remains fixed with the fixed housing. Vehicle coolant that escapes through the primary seal is channeled through a conduit toward the outside of the fixed housing. The seal further comprises means for causing solids dissolved in and carried by the vehicle coolant to be deposited in the conduit such that a portion of the conduit becomes clogged over time with the solids thereby creating a secondary seal to the primary seal.

One object of the present invention is to provide an improved self-sealing water pump seal which lessens the likelihood that normal coolant seepage will be misinterpreted as a coolant leak.

Another object of the present invention is to provide an improved water pump seal which has the ability to reseal itself in the event that the primary seal becomes defective causing a coolant leak.

Still another object of the present invention is to provide an improved water pump seal.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
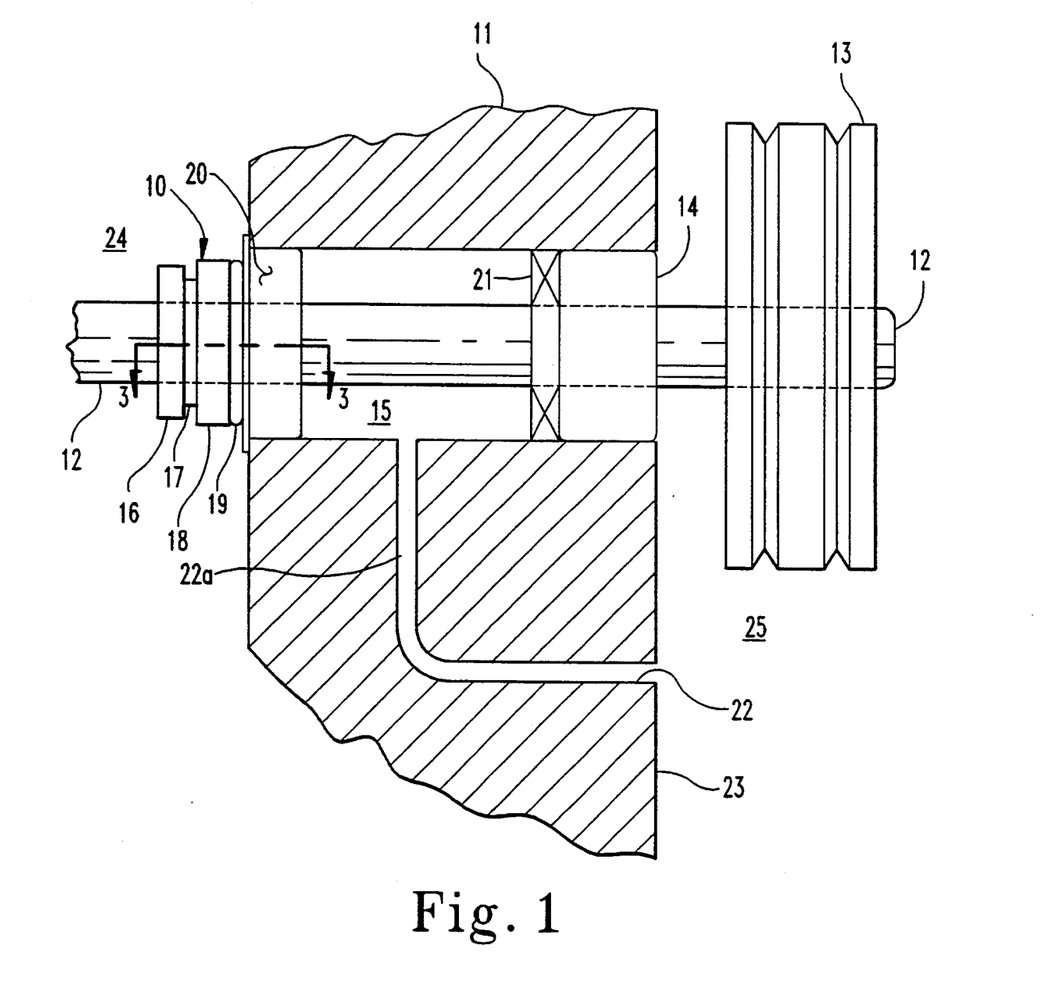
FIG. 1 is a partial sectioned side elevational view of a water pump showing a conventional water pump seal mounted between the rotating shaft and the fixed housing of the water pump.

Referring now to FIG. 1, there is shown a water pump seal 10 mounted between a fixed housing 11 of the water pump and the rotating shaft 12 of the water pump. A pulley wheel 13 is attached to the portion of the rotating shaft 12 which projects outside of the fixed housing 11. Pulley wheel 13 is driven by the engine via a belt (not shown) causing shaft 12 to rotate which in turn rotates the pump portion (not shown) of the water pump. A bearing 14 is mounted about the rotating shaft 12 and is mounted in one end of cylindrical cavity 15 of fixed housing 11.

The water pump of FIG. 1 can be thought of as having a fluid side 24 and an atmosphere side 25. Of course, the pressure in fluid side 24 is significantly higher when the engine is running than the atmospheric pressure on side 25 of the water pump. Thus, seal 10 must prevent vehicle coolant under pressure from escaping into conduit 15 of fixed housing 11. Fixed housing 11 includes a weep hole 22 and passageway 22a which opens into annular conduit 15 and allows any escaped vehicle coolant to be channeled away from the remaining portion of the engine to eventually drip along face 23 of fixed housing 11 to the ground. Any oil lubricant which escapes from bearing 14 past seal 21 likewise flows into annular conduit 15, through passageway 22a and out of weep hole 22.

Figure 2:
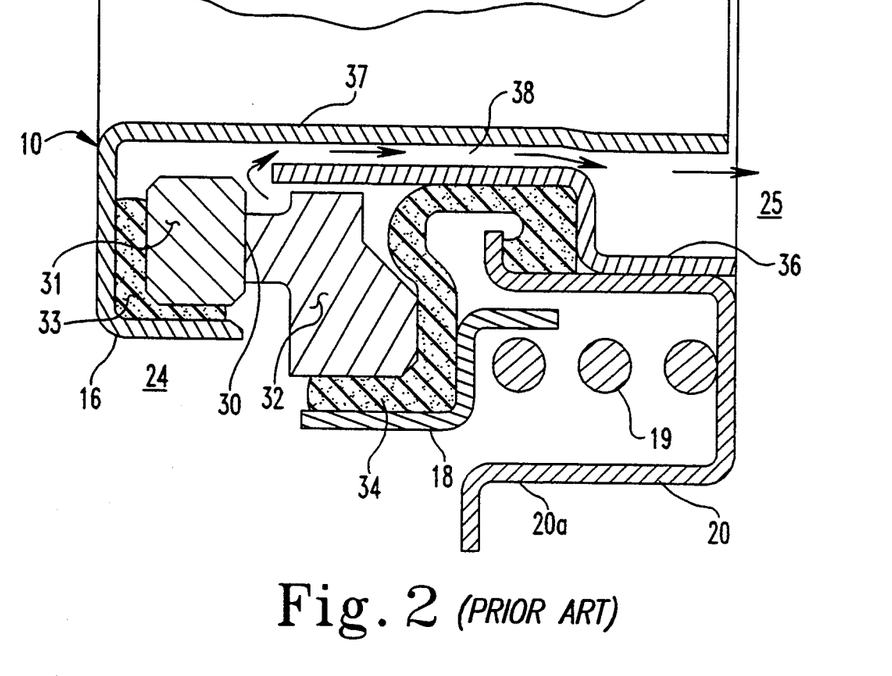
FIG. 2 is a partial sectioned side elevational view of a conventional water pump seal of the prior art.

FIG. 2 shows a cut-away view of a typical water pump seal 10 according to the prior art. For clarity, several of the interior parts of seal 10 which are viewable from the exterior are identified in FIG. 1. These include rotor stamping 16, stator seal face 17, stator ferrule 18, spring 19 and stator stamping 20. Accordingly, seal 10 of FIG. 2 includes a sheet metal rotor stamping 16 that includes a cylindrical portion 37 which is press-fit over the rotating shaft of the water pump. A drive cup 33 made from an elastomeric material is attached to the inner side of rotor stamping 16. Drive cup 33 supports and is attached to a donut-shaped rotor seal face 31. Rotor stamping 16, drive cup 33 and rotor seal face 31 all rotate with the rotating shaft of the water pump. The remaining portions of seal 10 are attached to and remain fixed with the fixed housing of the water pump (see housing 11 of FIG. 1).

The remainder of seal 10 includes stator stamping 20 that includes a cylindrical surface 20a which is press-fit into the fixed housing of the water pump. A rear ferrule 36 is then press-fit or otherwise attached to stator stamping 20. Attached to stator stamping 20 and rear ferrule 36 is bellows 34 which is made from a resilient elastomeric material. Bellows 34 is also attached to stator seal face 32 on one side and stator ferrule 18 on its other side. Compressed spring 19 presses against stator ferrule 18 which in turn forces stator seal face 32 in abutting relation against rotor seal face 31 to form a primary face seal 30.

Even when primary seal 30 of seal 10 is functioning properly, small amounts of vehicle coolant seep from fluid side 24 of the water pump through primary seal 30 and into an annular conduit 38 located between the cylindrical portion 37 of rotor stamping 16 and rear ferrule 36. This escaped coolant then travels through conduit 15 of the water pump housing (see FIG. 1) through passage 22a and out of weep hole 22, and is allowed to evaporate when exposed to the atmosphere side 25 of the water pump. Because there are no barriers between primary seal 30 and weep hole 22, the escaped vehicle coolant quickly escapes from the water pump without having the ability to deposit significant amounts of the solids dissolved in and carried by the vehicle coolant. One aspect of the present invention is directed toward forming a barrier between primary seal 30 and weep hole 22 in order to cause the solids dissolved from the escaped vehicle coolant to be deposited in annular conduit 38 and/or conduit 15 before the escaped coolant reaches the weep hole. Over time, these deposited solids build up and clog the conduit thereby creating a secondary seal to the primary seal 30.

Figure 3:
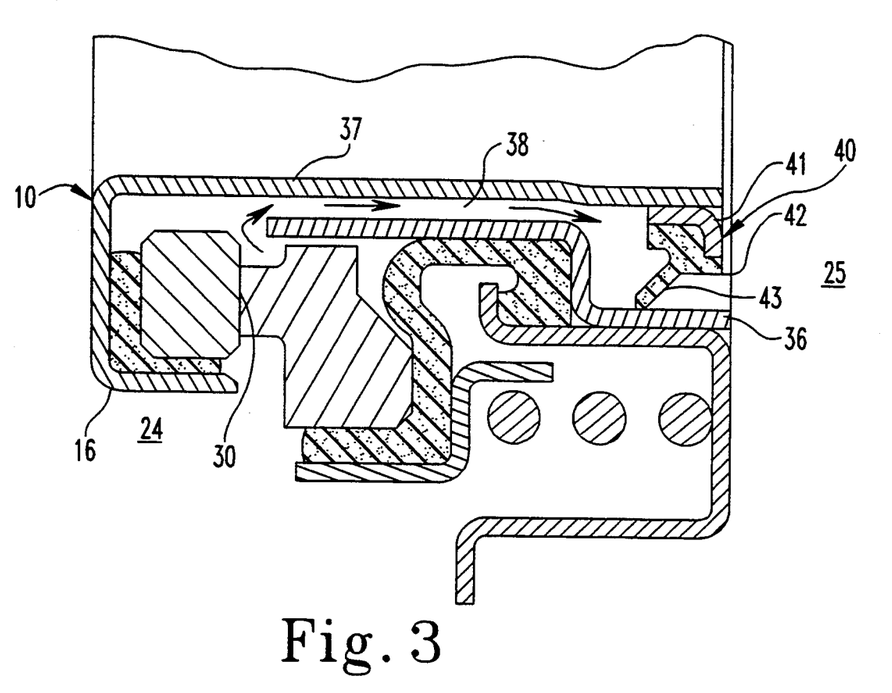
FIG. 3 is a partial sectioned side elevational view of a self-sealing water pump seal according to the present invention.
Figure 4:
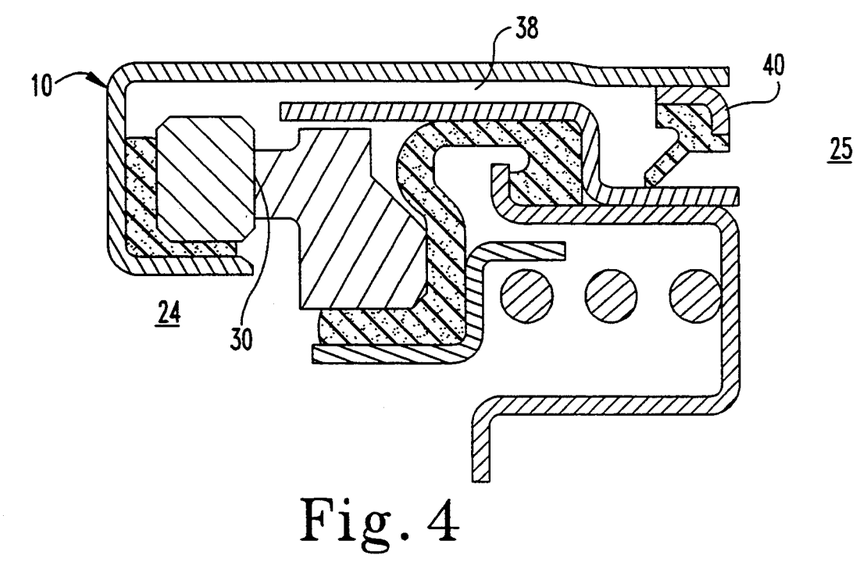
FIGS. 4–7 show a time lapse sequence of the self-sealing water pump seal of FIG. 3 illustrating the a self-sealing action of the present invention.
Figure 5:
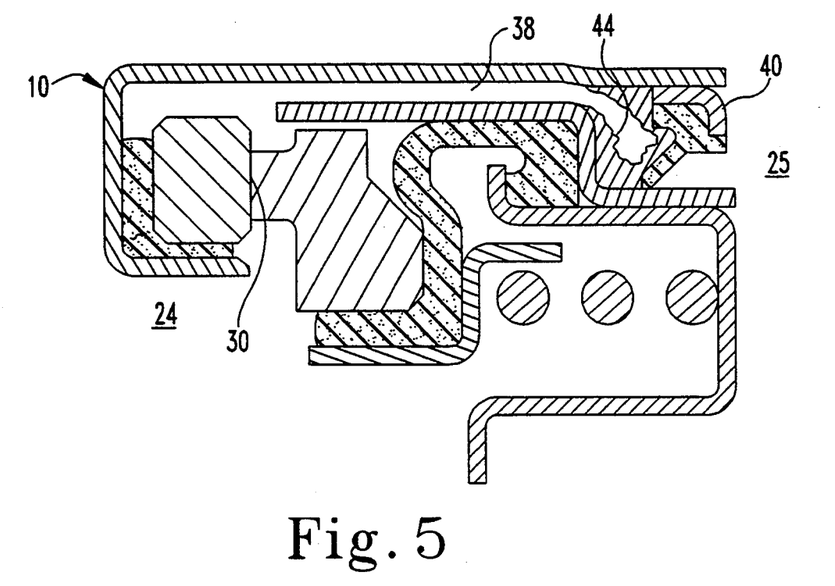
Figure 6:
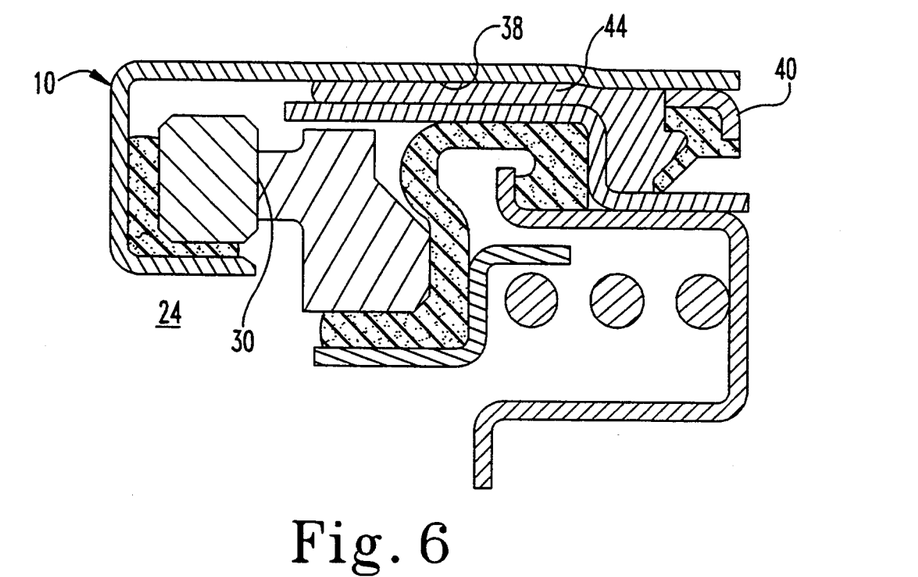

FIG. 3 shows a self-sealing water pump seal according to the preferred embodiment of the present invention which is identical in all respects to water pump seals of the prior art except that it includes an additional barrier 40. Barrier 40 simply prevents the escaped vehicle coolant from reaching the weep hole 22 of FIG. 1, and thus causes any solids dissolved in or carried by the escaped vehicle coolant to be deposited in annular conduit 38. Barrier 40 includes a metallic ring 41 having an L-shaped cross-section which is press-fit over cylindrical portion 37 of rotor stamping 16. An elastomeric ring 42 is attached to metallic ring 41 and includes an annular lip portion 43 which slides against the inner surface of rear ferrule 36 when the water pump shaft is rotating. In other words, barrier 40 is indirectly attached to and rotates with the shaft of the water pump. Barrier 40 need not necessarily present a fluid-tight seal like primary seal 30 but should present a sufficient obstacle to the escaped vehicle coolant flow through annular conduit 38 that substantial amounts of solids are deposited in annular conduit 38. It has been found that over time, the deposited solids will build up and create a clog in annular conduit 38 thus creating a secondary seal to the primary seal 30 of the water pump seal 10. Barrier 40 should have the ability to reliably inhibit normal coolant seepage past the primary seal 30 and actual coolant leakage in the case of a defective primary seal 30.

Figure 7:
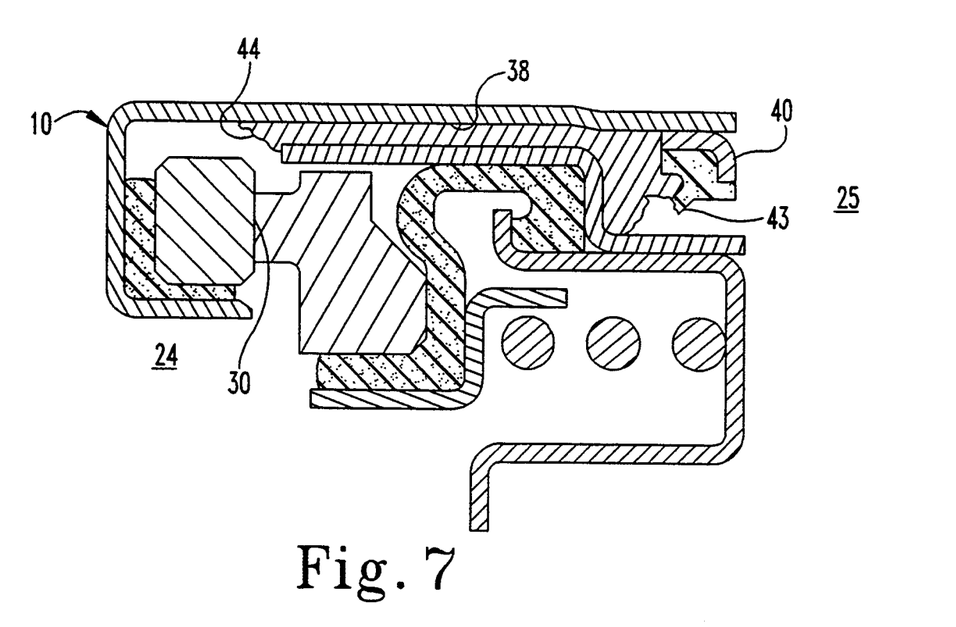

FIGS. 4–7 illustrate the action of the self-sealing water pump seal of FIG. 3 over time as a clog 44 of deposited solids is built up in annular conduit 38 thus creating a secondary seal to primary seal 30. It should be noted that FIGS. 4–7 could represent the relatively quick build-up of a clog 44 due to a defective primary seal 30 or could represent the relatively longer term build up of a clog 44 due to the normal seepage of vehicle coolant past primary seal 30. In any event, it is important to note that barrier 40 need not necessarily have an expected life as long as primary seal 30, but instead needs only to have a life sufficiently long to initiate the formation of clog 44. FIG. 7 shows that even though lip 43 of barrier 40 has deteriorated and no longer presents a barrier to the escaped coolant, the build up of clog 44 has already created a secondary seal to primary seal 30, and therefore, barrier 40 has served its purpose and is no longer needed. Thus, after clog 44 has formed, any vehicle coolant leakage or seepage will only cause clog 44 to grow and create an even stronger secondary seal behind primary seal 30.

Figure 8:
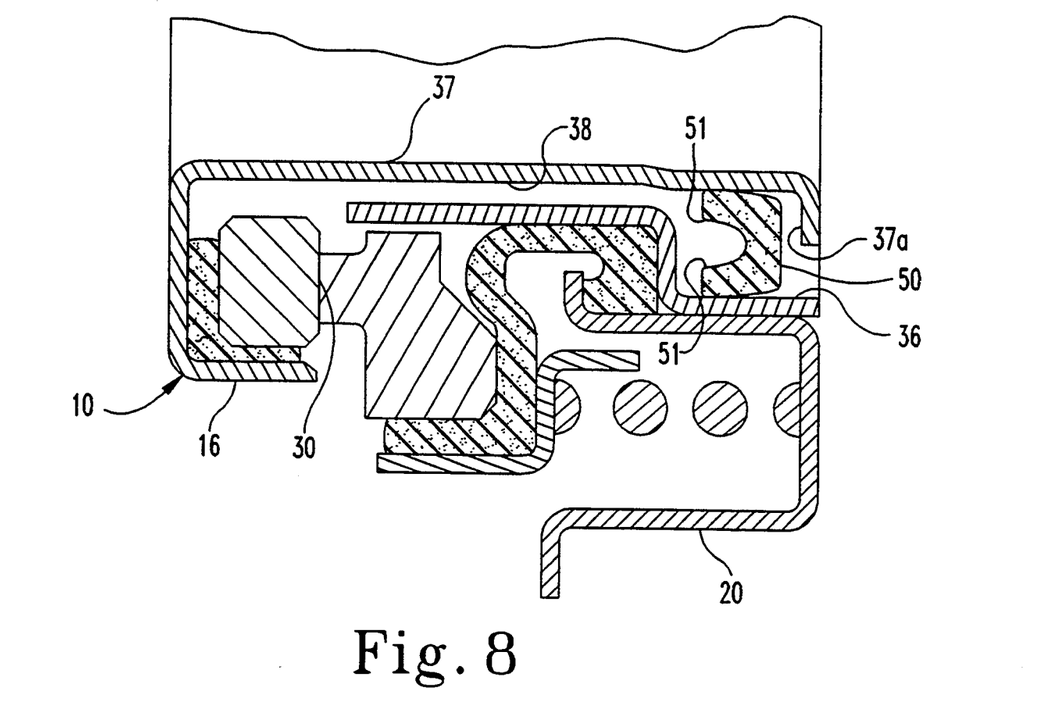
FIG. 8 is a partial sectioned side elevational view of a self-sealing water pump seal according to another embodiment of the present invention.

FIG. 8 shows a second embodiment of the present invention in which a conventional water pump seal 10 has the addition of a barrier 50 according to the present invention. In this case, barrier 50 is simply a ring made of an elastomeric material having a cross section as shown. Barrier 50 includes two lip extensions 51 projecting inward toward primary seal 30. In this embodiment, barrier 50 is not attached to either rotor stamping 16 or rear ferrule 36, but instead is held in place and prevented from escaping due to annular flange 37a on rotor stamping 16. Because barrier 50 is not actually attached to either the rotating or nonrotating portion of seal 10, barrier 50 rotates relative to both the rotating shaft of the water pump and the fixed housing of the water pump (see FIG. 1). Of course, the consequence being that the friction wear on barrier 50 is distributed to two surfaces rather than one as in the embodiment discussed previously. Because barrier 50 has two friction wear surfaces due to its relative rotation, it has the potential for a signficantly longer life, thus giving a clog more time to form before the barrier breaks down in the hostile environment of seal 10. Another variation of the present invention contemplates depositing a small amount of lubricant between the rotating surfaces of the barrier and the remainder of the seal to further increase the life of the barrier.

Figure 9:
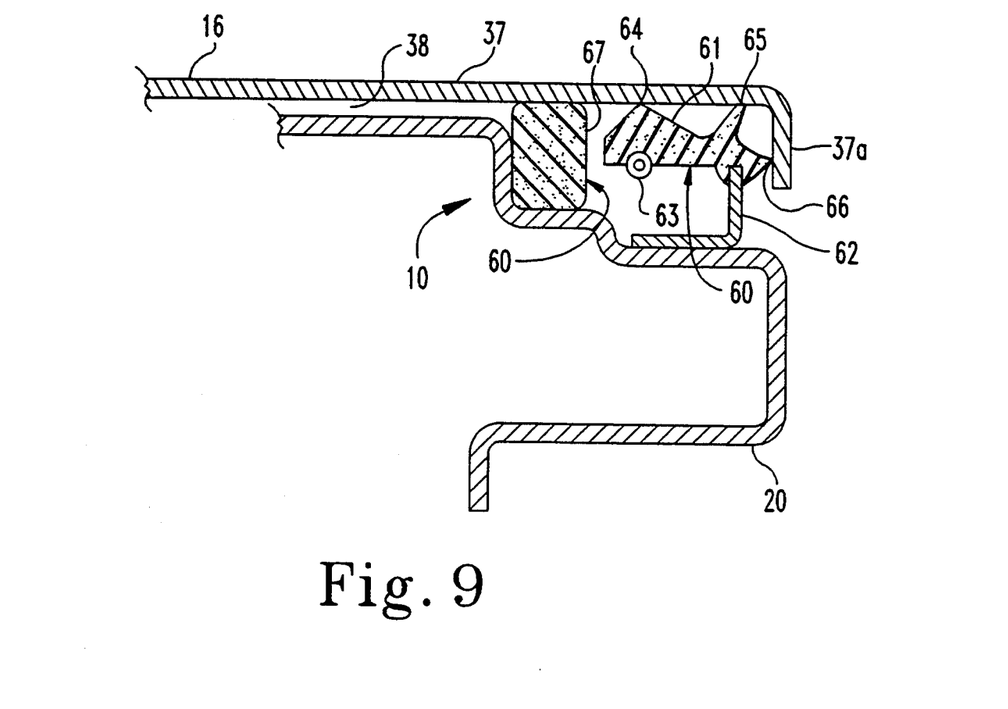
FIG. 9 is a partial sectioned side elevational view of still another embodiment of the self-sealing water pump seal of the present invention.

FIG. 9 shows still another embodiment of the present invention which is similar to the embodiments discussed earlier except that it includes a different type of barrier 60 and also includes an annular flange 37a as in the embodiment shown in FIG. 8. In this case, barrier 60 consists of two parts, namely, a foam ring 67 and a conventional lip seal 61. Lip seal 61 includes a circular metallic ring portion 62 having an L-shaped cross section and an elastomeric ring which includes lips 64, 65 and 66 which ride against the outer surface of rotor stamping 16 at three different locations. Lip seal 61 also includes an annular spring 63 which holds primary lip 64 against rotor stamping 16. It has been found that foam ring 67 quickly breaks down in the hostile environment of seal 10 into a powder form which provides numerous additional surfaces upon which the escaped vehicle coolant may deposit its solids, thus accelerating the formation of a clog in annular conduit 38. It should be noted that in the preferred embodiments, the barrier according to the present invention is placed as close as possible to the narrow portion of annular conduit 38 thus significantly decreasing the amount of volume that the deposited solids must fill before a clog forms. Nevertheless, the invention would still work even if a separate barrier was positioned in annular conduit 15 (see FIG. 1) before weep hole 22.

While the embodiments previously described only show various barrier means for causing the escaped vehicle coolant to deposit solids in the annular conduit leading from the primary seal 30 to the weep hole 22, other means are contemplated in accordance with the present invention. Among these are the possibility of creating tiny baffles in annular conduit 38 to impede coolant flow to thereby cause it to deposit the solids dissolved in and carried by the coolant before the escaped coolant reaches weep hole 22. Another possibility could include simply packing the annular conduit with a foam or other similar material which would quickly break down and create a solid mass which could capture solids from the escaped vehicle coolant and accelerate the formation of a clog. Still another possibility could be the inclusion of a chemical coating on the surface of annular conduit 38 which would react with the escaped vehicle coolant and cause the coolant to deposit solids on the walls of annular conduit 38 thus initiating the formation of a clog. In any event, what is important to the present invention is some means for causing the solids dissolved in and carried by the vehicle coolant that escape past the primary seal 30 to be deposited in the annular conduit leading to the weep hole in order to prevent the escaped coolant from ever exiting the weep hole. Thus, the present invention will prevent false indications of a defective water pump seal caused by the normal and proper escape of small amounts of coolant past the primary seal and will also cause the formation of a clog behind the primary seal, to create a secondary seal to the primary seal in cases of either normal coolant seepage or actual leakage.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:
1. A water pump comprising:
   a water pump housing having an outer wall with a coolant side and an opposite atmosphere side, said outer wall defining a main passageway through said outer wall and weep hole passageway extending between said main passageway and said atmosphere side;
   a rotatable shaft disposed in said main passageway and extending in one direction beyond said coolant side and in the opposite direction beyond said atmosphere side; and
   a self-sealing water pump seal positioned around said rotatable shaft and including:
   (a) a primary seal mounted in said main passageway between the rotatable shaft and the housing to prevent vehicle coolant from escaping to said atmosphere side, said primary seal comprising first and second face seal components resiliently urged into an abutting and sealing relationship to one another, said first face seal component being attached to the rotatable shaft and said second face seal component being attached to the housing, whereby vehicle coolant that escapes through said primary seal is allowed to flow to said atmosphere side by way of said weep hole passageway; and
   (b) a barrier positioned between said primary seal and said weep hole passageway and restricting the flow of coolant escaping from said primary seal so as to cause the deposition of solids out of said coolant to gradually form a secondary seal, wherein said barrier includes an elastomeric ring.

2. The water pump of claim 1 wherein said elastomeric ring is carried by and rotates with said rotatable shaft.

3. The water pump of claim 1 wherein said elastomeric ring is carried by and remains fixed with respect to said housing.

4. The water pump of claim 1 wherein said elastomeric ring rotates with respect to both the rotatable shaft and the housing when said shaft is rotating.

5. A water pump comprising:
   a water pump housing having an outer wall with a coolant side and an opposite atmosphere side, said outer wall defining a main passageway through said outer wall and a weep hole passageway extending between said main passageway and said atmosphere side.
   a rotatable shaft disposed in said main passageway and extending in one direction beyond said coolant side and in the opposite direction beyond said atmosphere side; and
   a self-sealing water pump seal positioned around said rotatable shaft and including:
   (a) a donut-shape casing designed and arranged to be mounted between said rotatable shaft and said housing, said casing having a coolant side and an opposite atmosphere side and defining an annular conduit therethrough;
   (b) a first face seal mounted in said casing;
   (c) a second face seal mounted in said casing;
   (d) spring means for resiliently urging said first face seal against said second face seal to substantially close said annular conduit thereby creating a primary seal, whereby vehicle coolant that escapes between said first and second face seals is channeled through a portion of said annular conduit to said atmosphere side; and
   (e) a barrier positioned between said primary seal and said weep hole passageway and restricting the flow of coolant escaping from said primary seal so as to cause the deposition of solids out of said coolant to gradually form a secondary seal, wherein said barrier includes an elastomeric ring.

6. The water pump of claim 5 wherein said elastomeric ring is carried by and rotates with said rotatable shaft.

7. The water pump of claim 5 wherein said elastomeric ring is carried by and remains fixed with respect to said housing.

8. The water pump of claim 5 wherein said elastomeric ring rotates with respect to both the rotatable shaft and the housing when said shaft is rotating.

9. A water pump comprising:
 a water pump housing having an outer wall with a coolant side and an opposite atmosphere side, said outer wall defining a main passageway though said outer wall and a weep hole passageway extending between said main passageway and said atmosphere side;
 a rotatable shaft disposed in said main passageway and extending in one direction beyond said coolant side and in the opposite direction beyond said atmosphere side; and
 a self-sealing water pump seal positioned around said rotatable shaft and including:
   (a) a donut-shape casing sized to be mounted between said rotatable shaft and said housing, said casing having a coolant side and an opposite atmosphere side and defining an annular conduit therethrough;
   (b) a first face seal mounted in said casing;
   (c) a second face seal mounted in said casing;
   (d) a spring for resiliently urging said first face seal against said second face seal to substantially close one end of said annular conduit, whereby vehicle coolant that escapes between said first and second face seals is channeled through a portion of said annular conduit; and
   (e) barrier means positioned between said primary seal and said weep hole passageway for restricting the flow of coolant escaping from said primary seal so as to cause the deposition of solids out of said coolant to gradually form a secondary seal wherein said barrier includes an elastomeric ring.

10. The water pump of claim 9 wherein said elastomeric ring is carried by and rotates with said rotatable shaft.

11. The water pump of claim 9 wherein said elastomeric ring is carried by and remains fixed with respect to said housing.

12. The water pump of claim 9 wherein said elastomeric ring rotates with respect to both the rotatable shaft and the housing when said shaft is rotating.

* * * * *

UNITED STATES PATENT AND TRADEMARK OFFICE
CERTIFICATE OF CORRECTION

PATENT NO. : 5,336,047

DATED : August 9, 1994

INVENTOR(S) : J. Steven Kolhouse

It is certified that error appears in the above-identified patent and that said Letters Patent is hereby corrected as shown below:

Col. 1, at line 27, replace "tile" with --the--.

Col. 1, at line 56, replace "tile" with --the--.

Col. 7, at line 15, replace "though" with --through--.

Signed and Sealed this

Eleventh Day of October, 1994

Attest:

BRUCE LEHMAN

Attesting Officer

Commissioner of Patents and Trademarks